UNITED STATES PATENT OFFICE.

WILLIAM HAZEN, OF MILWAUKEE, WISCONSIN.

IMPROVED PROCESS FOR TEMPERING STEEL.

Specification forming part of Letters Patent No. 44,310, dated September 20, 1864.

*To all whom it may concern:*

Be it known that I, WILLIAM HAZEN, of the city of Milwaukee, county of Milwaukee, and State of Wisconsin, have discovered and invented a new and improved method or process for tempering steel springs for the use of locomotives and railway-carriages, and for all kinds of steel springs; and I do hereby declare that my invention and discovery consists in preparing the liquor or water in which any such spring is to be tempered in the following manner:

Into the quantity of water required I introduce and mix the following substances or ingredients, and in the following proportions of each, to wit: aqua-ammonia, two ounces; copperas, (sulphate of iron,) two ounces, and of sal-ammoniac two pounds, and put these ingredients into a small kettle or other convenient vessel, with water sufficient, and boil the mass till all is thoroughly dissolved. I also use a wooden box or trough five feet in length by two feet in width and two feet in depth. Fill this trough with the desired quantity of water and pour into and mix with it the decoction or liquor prepared as above. This quantity, thus prepared, will possess the virtue for tempering twenty locomotive driving-springs, when, if you would temper more than twenty such springs, the water must be impregnated anew; and I claim that this mode or process of tempering steel springs renders them twice as tough, strong, and elastic as any other known process, so that in my spring there is a saving of one-half in the quantity of steel used and the weight to be carried, and my spring need be only half the weight and size of ordinary springs.

This process, as above described, I claim as my own discovery and invention, and I desire to secure Letters Patent therefor.

WILLIAM HAZEN.

Witnesses:
C. FITZGERALD,
MICHAEL WELSH.